O. W. BAKER.
PISTON CONSTRUCTION.
APPLICATION FILED MAR. 18, 1921.
1,427,930. Patented Sept. 5, 1922.
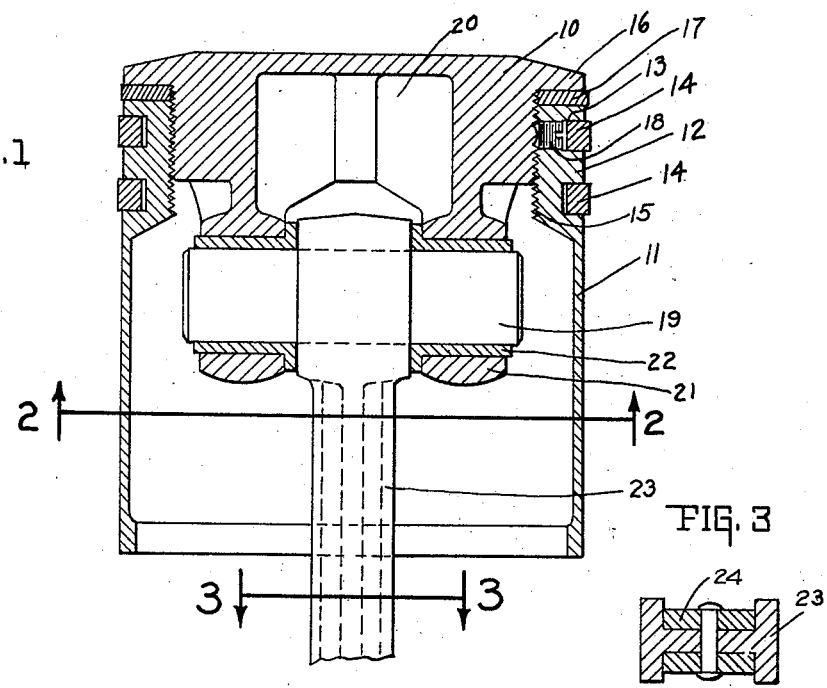
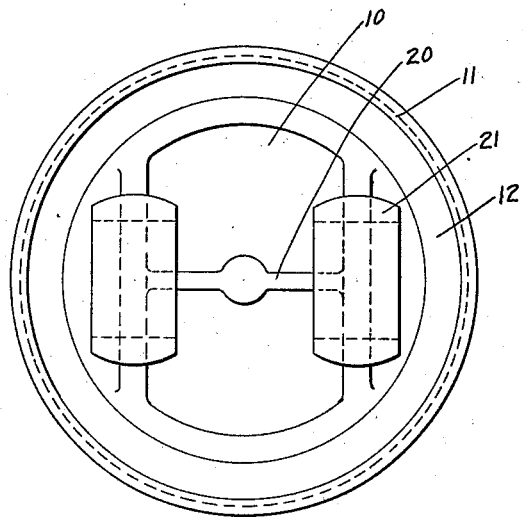
Inventor
ORVILLE W. BAKER.
By
Attorneys Patented Sept. 5, 1922.

1,427,930

UNITED STATES PATENT OFFICE.

ORVILLE W. BAKER, OF INDIANAPOLIS, INDIANA.

PISTON CONSTRUCTION.

Application filed March 18, 1921. Serial No. 453,214.

*To all whom it may concern:*

Be it known that I, ORVILLE W. BAKER, a citizen of the United States, and a resident of Indianapolis, county of Marion, and State of Indiana, have invented a certain new and useful Piston Construction; and I do hereby declare that the following is a full, clear, and exact description thereof, reference being had to the accompanying drawings, in which like numerals refer to like parts.

This invention relates to the construction of a piston to be used in those types of engines employing a piston for transmitting power.

The feature of the invention is the means for carrying away the intense heat of the piston head from the skirt so as to reduce the consequent expansion of the walls of the piston, which is accomplished by means of the copper gasket hereinafter described.

The heat on the piston head would be conducted directly down through its direct connection with the copper strips on the connecting rod, to the crank shaft and thence dissipated in the oil. Said copper ring further serves as a lapping agent which will lap down any irregular expansion which might occur by unequal thickness of the cylinder wall, and act as a polishing agent by filling up minor scratches in said wall. It would also absorb sand and hard particles received into the cylinder through the intake.

The full nature of this invention will be understood from the accompanying drawings and the following description and claims.

In the drawings Fig. 1 is a central vertical cross section through the piston. Fig. 2 is a section taken on the line 2—2 of Fig. 1 with the wrist pin and connecting rod removed. Fig. 3 is a section taken on the line 3—3 of Fig. 1.

In the drawings there is shown a piston having a head 10 which is preferably an aluminum casting or aluminum alloy or other metals having similar properties. The body of the cylinder is formed of a cast iron annular skirt 11 which is hollow and provided with a relatively thin wall. Near the top of the skirt the wall is thickened at 12 to provide annular recesses 13 to receive the piston rings 14 and provide an internally screw threaded portion 15 into which the head 10 may be tightly screwed. Between the top flange portion 16 of the head 10 and the skirt, there is an annular ring or gasket 17 of slightly larger diameter than the head and skirt formed of copper or a similar relatively soft heat conducting metal. The gasket 17 is disposed between the top surface of the head 10 and sleeve 11 and adapted to carry away the intense heat generated on the head of the piston from the skirt, whereby the skirt will remain relatively cool as compared to the head. The copper gasket 17 also provides a metallic surface which, being of greater diameter than the head and skirt, will engage the walls of the cylinder and prevent the usual noisy slap. Owing to the relative softness and lapping tendency of the metal it will have a cushioning effect and give the wall of the cylinder a high smooth polish, lapping down irregularities that might occur, and absorbing foreign matter. The skirt and piston head may be locked in position after they have been screwed securely together by the lock screw 18 which extends through the portion 12 of the skirt from one of the recesses 13 into the threaded portion of the head 10, the ring preventing the set screw from working out.

For providing bearings for the wrist pin 19, the head 10 is cast with a diametrically disposed web portion 20 which extends downwardly from the top thereof. Cast integral with the web portion there are bearing supports or journals 21 in which there are mounted the bearings 22 through which the wrist pin 19 is adapted to extend. The wrist pin, therefore, has its bearing in the cylinder head rather than the walls of the skirt, as is customary, and the intense heat generated in the head 10, will be conducted away through the wrist pin 19 and connecting rod 23 rather than through the skirt of the piston. To aid in the conduction of heat through said connecting rod, there are provided copper strips 24, secured on each side thereof.

The invention claimed is:

1. As an article of manufacture, a piston having piston rings thereon, and means independent of said rings mounted on the outer periphery of and connected with said piston for facilitating the conduction of heat from the head thereof.

2. A piston adapted to operate within a cylinder and provided with a head portion and a skirt portion, a plurality of piston rings mounted about the periphery thereof, means for operating said piston within the cylinder, and a soft metal gasket mounted about the periphery of said piston adjacent the head thereof and extending laterally therefrom for engagement with the cylinder wall for lapping down an irregular expansion in said wall and polishing the same by filling in minor scratches therein.

3. A piston comprising a head independently and separately formed from the skirt a plurality of piston rings surrounding the skirt, a heat conducting gasket mounted between said head and skirt independent of said rings, and means for securing said head, skirt and gasket in position relative to each other.

4. A piston comprising a head independently and separately formed from the skirt a plurality of piston rings surrounding the skirt, a heat conducting soft metal gasket havings it outer surface substantially flush with the outer surface of said head and skirt and mounted independent of said rings, and means for securing said head, skirt and gasket in position relative to each other.

5. A piston comprising a head, wrist pin bearings formed integral with and depending from said head, a skirt formed separately and independently of said head and substantially co-extensive with the length of said piston, means for securing said head and skirt together to complete the piston construction whereby the driving force of said piston will be transmitted from the head only, and a heat conducting gasket interposed between said head and piston for conducting the heat generated on said head therefrom, so as to prevent its transmission to said skirt.

6. A piston comprising a head portion and a skirt portion, means for conducting the heat generated on said head away from said skirt portion, and a connecting rod connected directly with said head for facilitating the conduction of heat therefrom, said rod being spaced from said skirt.

7. A piston comprising a head portion and a skirt portion, a connecting rod, a wrist pin and wrist pin bearings connected to said head for transmitting the driving force of said head through said connecting rod, and heat conducting strips secured to said connecting rod for facilitating the conduction of heat directly from said head through said rod.

In witness whereof I have hereunto affixed my signature.

ORVILLE W. BAKER.